United States Patent [19]

Johnson

[11] 4,007,710
[45] Feb. 15, 1977

[54] MILK LINE CHECK VALVE

[75] Inventor: Kendall R. Johnson, Albert Lea, Minn.

[73] Assignee: Universal Cooperatives, Inc., Albert Lea, Minn.

[22] Filed: Feb. 27, 1976

[21] Appl. No.: 661,850

[52] U.S. Cl. .................. 119/14.03; 137/533.11
[51] Int. Cl.² ............................................. A01J 5/00
[58] Field of Search ............... 137/533.11, 519.5; 119/14.09, 14.18, 14.03

[56] References Cited

UNITED STATES PATENTS

| | | | |
|---|---|---|---|
| 971,295 | 9/1910 | Menear et al. | 137/533.11 X |
| 1,892,649 | 12/1932 | Buengel | 137/533.11 |
| 2,730,992 | 1/1956 | Kessler | 119/14.03 |

FOREIGN PATENTS OR APPLICATIONS

| | | | |
|---|---|---|---|
| 739,289 | 8/1943 | Germany | 137/533.11 |

Primary Examiner—William R. Cline
Attorney, Agent, or Firm—Schroeder, Siegfried, Ryan & Vidas

[57] ABSTRACT

A check valve designed for incorporation in a milk line of large milking systems is comprised of a vertical tubular member having an outlet tube of smaller bore extending laterally therefrom at right angles thereto and a spherical valve element within the vertical member having a diameter considerably less than the bore of said member and greater than the bore of the outlet tube. The vertical tube extends above the discharge outlet a distance equal to the diameter of the valve element, is sealed at its upper end, and receives the valve element therein when milk is pumped through the lower end and out of the outlet tube. A horizontally extending circular valve seat is carried by the lower end portion of the vertical tubular member closely adjacent to the outlet tube and cooperates with the valve element to prevent return flow of milk from the outlet tube when pumping through the line ceases. The valve is more simple and less expensive to manufacture and eliminates the need for an elbow in the conventional milk line between the milk pump and cooler.

9 Claims, 3 Drawing Figures

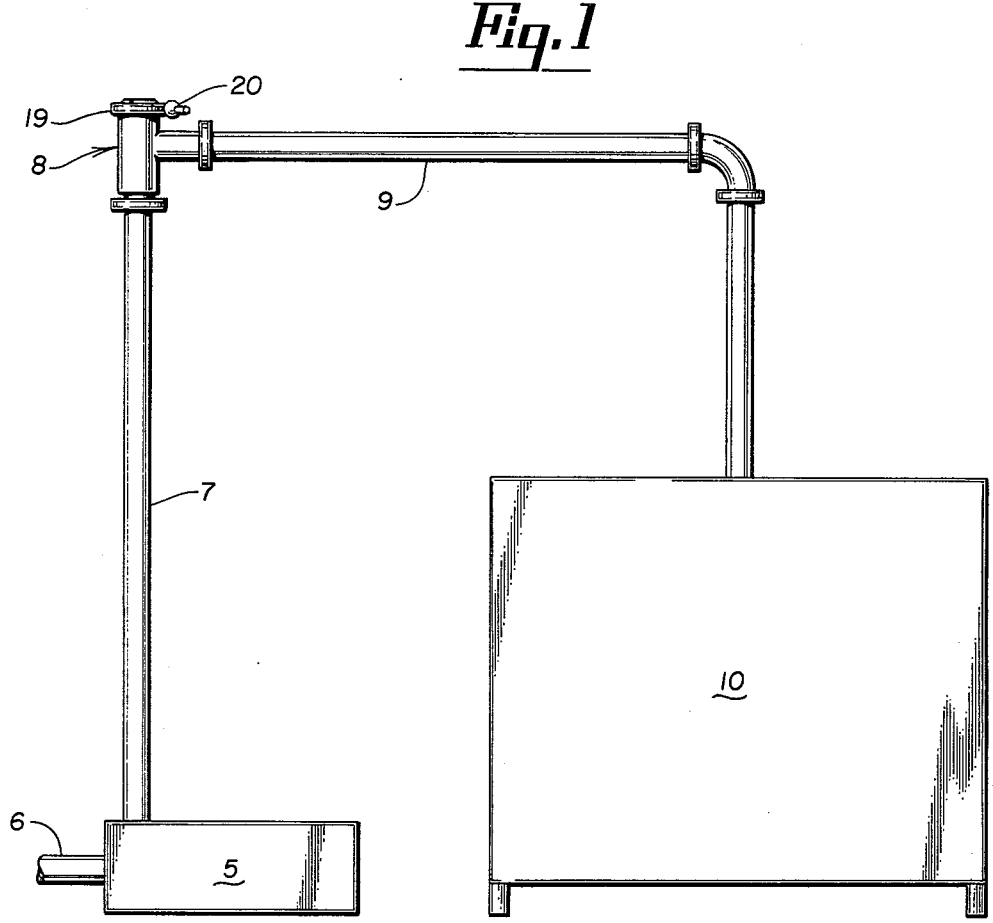
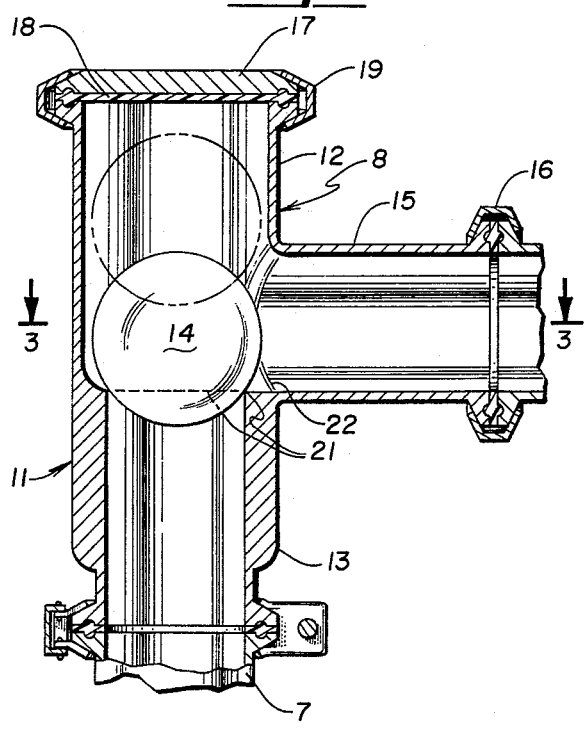
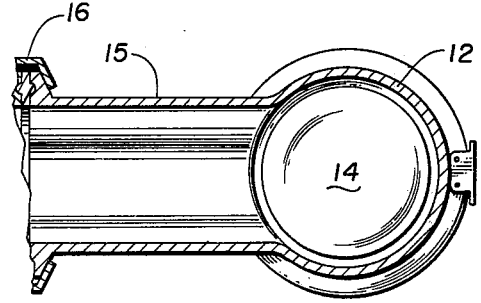

MILK LINE CHECK VALVE

It is a general object of my invention to provide a novel and improved milk line check valve which is simple and less expensive to manufacture.

A more specific object is to provide a novel and improved milk line check valve which operates efficiently, is simple and less expensive to manufacture, and eliminates the need for an elbow in the line.

Another object is to provide a novel and improved milk line which is simple and inexpensive in construction and easy to clean.

Another object is to provide a novel and improved milk line check valve which obviates the need for an interior runway for the valve element.

These and other objects and advantages of my invention will more fully appear from the following description, made in connection with the accompanying drawings, wherein like reference characters refer to the same or similar parts throughout the several views, and in which:

FIG. 1 is a diagrammatic view of a portion of the milk line system of the large type, illustrating the proper positioning and use of one of my check valves therein to provide maximum advantages.

FIG. 2 is a vertical sectional view taken on an enlarged scale through my improved check valve with the valve element shown in elevation.

FIG. 3 is a horizontal sectional view taken along lines 3—3 of FIG. 2, but shown in reverse position.

Milk line check valves presently available on the market are difficult and expensive to manufacture. This is true because they require that a special runway for the valve element, which necessitates special machining, be provided. Most such check valves are mounted in a horizontal plane within the milk line and all such mountings make it necessary to provide an additional elbow at the upper end of the upright portion of the milk line which extends upwardly from the milk pump. Some such check valves are Y-shaped, some are conically shaped, and others use a combination of straight tubing and elbow construction. All are relatively expensive to manufacture because they require special machining for either the branches, or the valve runways, or both.

In the larger milk systems utilized today, it is conventional to provide a receiver for receiving the milk from the milkers and to provide a pump in association therewith for pumping the milk from the receiver to an elevated level and thence across to a remotely located atmospheric cooler. It is important in such systems to preclude backward flow of milk through the vertical portion of the line extending from the pump to the horizontal portion which is at the predetermined elevated level. An elbow is required at the point of juncture of the vertical and horizontal portions of that milk line. In addition, most manufacturers provide some type of check or flap valve in the horizontal portion to preclude return flow of milk through the line when the pump ceases to be operated. My check valve is designed to obviate the need for the elbow, to operate more effectively, and to require less expense to be manufactured.

FIG. 1 illustrates diagrammatically a portion of such a large type milking system with the milk being received by the pump 5 through conduit 6 and pumped upwardly through the vertical portion of the line represented by vertical tube 7. My check valve 8 is connected at its inlet to the upper end of the tube 7 and its discharge is connected to the horizontal portion of the line represented by the horizontal tube 9 which, in turn, is connected to and discharges into the remotely located cooler 10.

The details of my check valve 8 can best be seen by reference to FIGS. 2 and 3. As shown, it is comprised of a vertical tubular member 11 having an upper portion 12 and a lower portion 13. A spherical valve element 14 is disposed within the bore of the tubular member 11, the diameter of the valve 14 being considerably less than the bore of the upper portion 12, but larger than the diameter of the bore of the lower portion 13. The valve element 14 is preferably formed of a steel ball coated with a hard plastic material such as Teflon.

An outlet tube 15 extends outwardly and at right angles to the upper portion 12 of the tubular member 11 and is connected to horizontal tube 9 by clamp 16. The bore of horizontal tube 15 is less than the diameter of the valve element 14.

The upper end portion 12 of the vertical tubular member 11 extends upwardly above the horizontal outlet tube 15 a distance at least substantially as great as the diameter of the ball or valve element 14 so as to accommodate the latter in an out of way position when it is moved to open position as shown in broken lines in FIG. 2. The upper ends of the portion 12 is sealed or capped with a cap member 17 and gasket 18 which are secured in position by a conventional clamp member 19 having an adjustable threaded tightener 20.

A horizontally extending circular valve seat 21 is provided at the upper end of the lower portion 13 of the tubular member 11. As shown, the valve seat 13 is located closely adjacent to the horizontal outlet tube 15 and cooperates with valve element 14 to prevent any return flow of milk from outlet tube 15 when the pump 5 ceases to operate. Outlet tube 15 defines a discharge port 22 where it is joined to the tubular member 11. This port 22 extends in more than one vertical plane as shown in FIG. 2 and is of such shape and size relative to the valve element 14 as to preclude seating of the latter to seal off the flow through tube 15 when the pump is operating.

When the pump 5 commences to operate, the milk is drawn from the receiver (not shown) through the conduit 6 and forced rapidly upwardly through the tube 7. When the flow of milk strikes the ball 14, the latter is projected directly upwardly into the broken line position shown in FIG. 2, directly beneath and bearing against the cap 17. Thus, the flow of milk is forced outwardly through the outlet tube 15 and is carried by the tube 9 to the cooler 10. Since the discharge port 22 is of such a size and shape that the ball 14 cannot properly seat against the same so as to seal off the flow, there is no danger that such a flow will be precluded. When the upward flow through tube 7 ceases as a result of the pump 5 ceasing to operate, the valve element 14 immediately drops downwardly into return flow blocking position which is shown in solid lines in FIG. 2 and cooperates thereafter with valve seat 21 to prevent the return flow of milk into the lower portion 13 of the tubular member 11 and the tube 7.

One of the principal advantages of my milk line check valve is that it is so simple and inexpensive to manufacture. From the drawings, it can be readily seen that a minimum of machining is required to manufacture this milk valve since no runway is needed for the valve element. Thus, a substantial saving can be effected through the manufacture and use of this type of valve. In addition, the valve element closes more quickly since there is no friction between the valve element and a runway and a direct vertical drop from open to closing position is feasible. Thus, my check valve is more efficient, as well as less expensive. Also, it is a relatively simple device to clean by merely removing the clamp 19 and the cap 17, if it is desired.

In addition to the above, one of the principal advantages of my milk line check valve is that it obviates the need for an elbow at the juncture of vertical tube 7 and horizontal tube 9. Thus, an additional substantial saving is effected.

It will, of course, be understood that various changes may be made in the form, details, arrangement and proportions of the parts without departing from the scope of my invention which consists of the matter shown and described herein and set forth in the appended claims.

I claim:

1. In a milk line having a vertically extending portion and a horizontal portion for carrying milk vertically from a milk pump and then horizontally to a more remote location, a check valve disposed within the line comprising:
   a. a vertically extending tubular member having a sealed upper end portion and having an open lower end portion constituting a milk inlet;
   b. a horizontally extending outlet tube connected to the upper end portion of said vertically extending tubular member in milk-receiving relation and extending at right angles outwardly therefrom and having a discharge outlet connected in milk-delivering relation to the horizontal portion of the milk line;
   c. a spherical valve element carried within the bore of said upper end portion of said vertical tubular member and movable vertically therewithin;
   d. said upper end portion having an open bore above said outlet tube sufficiently greater than the diameter of said valve element to permit the latter to move freely upwardly and downwardly therewithin and being sealed at a level above said outlet tube a distance at least substantially as great as the diameter of said valve element and being devoid of valve guide elements;
   e. said lower end portion of said tubular member having a bore which is uniform throughout its length and of lesser diameter than the diameter of said valve element and equal to the bore of said outlet tube and having a milk inlet connected to the vertically extending portion of the milk line in milk-receiving relation;
   f. a cooperative horizontally extending circular valve seat carried by said lower end portion immediately adjacent to said outlet tube and having a diameter smaller than the diameter of said valve element and cooperating therewith to seal off said lower end portion of said tubular member against a return flow from said outlet tube;
   g. said outlet tube having a uniform bore throughout its length and lesser in diameter than said valve element and defining a discharge port in the side wall of said upper portion of said tubular member, said discharge port being of such diameter and constructed and shaped to preclude said valve element from entering said outlet tube and from effectively sealing off the flow of milk upwardly through said lower portion into said outlet tube.

2. The structure defined in claim 1 wherein said upper end portion of said tubular member is sealed at a level above said outlet tube a distance substantially equal to the diameter of said valve element.

3. The structure defined in claim 1 wherein said discharge port in the side wall of said upper end portion of said tubular member is equal in diameter to the bore of said outlet tube.

4. The structure defined in claim 1, wherein said discharge port in the side wall of said upper end portion of said tubular member is equal in diameter to the bore of said outlet tube and extends in more than one vertical plane.

5. The structure defined in claim 1, wherein the diameter of the bore of said outlet tube is less than the diameter of the bore of said lower end portion of said tubular member.

6. The structure defined in claim 1 wherein said discharge port in the side wall of said upper end portion of said tubular member is substantially smaller in diameter than the diameter of said valve element.

7. A check valve comprising:
   a. a vertically extending tubular member having an upper end portion sealed at its upper end and a lower end portion open at its lower end and adapted thereat to be connected to a vertical portion of a milk line in milk-receiving relation;
   b. a horizontally extending outlet tube connected to said upper end portion of said vertically extending tubular member in milk-receiving relation and extending at right angles outwardly therefrom and having a milk discharge outlet-defining portion adapted to be connected in milk-delivering relation to a horizontal portion of a milk line;
   c. a spherical valve element carried within the bore of said upper end portion of said vertical tubular member and movable vertically therewithin;
   d. said upper end portion of said tubular member having an open bore above said outlet tube greater than the diameter of said valve element and of sufficient size to permit the latter to move freely upwardly therewithin to a level well above the central axis of said outlet tube and being sealed at a level above said outlet tube a distance at least substantially as great as the diameter of said valve element and being devoid of valve guide elements;
   e. said lower end portion of said tubular member having a bore which is uniform throughout its length and is of lesser diameter than the diameter of said valve element and having a milk inlet at its lower end adapted to be connected to a vertically extending milk line in milk-receiving relation;
   f. a horizontally extending cooperative circular valve seat disposed within said lower end portion of said tubular member and carried thereby at substantially the same level as the lower wall of said outlet tube and having a bore diameter smaller than the diameter of said valve element and cooperating therewith to seal off said lower end portion of said tubular member against a return flow of milk from said outlet tube when said lower end portion and said outlet tube are so connected to such a milk line;
   g. said outlet tube having a bore which is uniform throughout its length and is lesser in diameter than the diameter of said valve element and defining a discharge port in the side wall of said upper end portion of said tubular member, said discharge port being of such diameter and constructed and shaped to preclude said valve element from entering said outlet tube and to prevent effective sealing off of the flow of milk upwardly through said lower portion of said tubular member into said outlet tube.

8. The structure defined in claim 7 wherein said upper end portion of said tubular member is sealed at a level above said outlet tube a distance substantially equal to the diameter of said valve element.

9. In a milk line, the combination of:
a. a power driven milk pump connected in milk-receiving relation to a source of milk;
b. a vertically extending milk line portion connected to said milk pump in milk-receiving relation therewith;
c. a check valve including a vertically extending tubular member having a lower end portion connected to said vertically extending milk line portion in milk-receiving relation and having an upper end portion with an open bore sealed at its upper end and devoid of valve guide elements;
d. said check valve including a horizontally extending outlet tube of uniform bore throughout its length connected to said upper end portion of said tubular member in milk-receiving relation and extending at right angles outwardly therefrom and having a milk discharge outlet defining portion;
e. said check valve including a spherical valve element carried within the bore of said upper end portion of said tubular member and movable vertically therewithin to a position above said discharge outlet;
f. said upper end portion of said tubular member having an open bore above said outlet tube greater than the diameter of said valve element and of sufficient size to permit the latter to move freely upwardly and downwardly therewithin and being sealed at a level above said outlet tube a distance at least substantially as great as the diameter of said valve element;
g. said lower end portion of said tubular member having a bore which is uniform throughout its length and is of lesser diameter than the diameter of said valve element and having a milk inlet at its lower end receiving milk from said vertically extending milk line portion;
h. said check valve including a horizontally extending cooperative circular valve seat carried by said lower end portion of said tubular member immediately adjacent to said outlet tube and above said inlet and having a diameter smaller than the diameter of said valve element and cooperating therewith when said pump is not driven to seal off said lower end portion of said tubular member against a return flow of milk from said outlet tube;
i. a horizontally extending milk line portion connected to said milk discharge outlet of said outlet tube in milk-receiving relation, and
j. a milk cooler remotely located relative to said check valve and said milk pump and connected to said horizontally extending milk line portion in milk-receiving relation.

* * * * *